United States Patent [19]
Manino et al.

[11] 3,879,337
[45] Apr. 22, 1975

[54] ADHESIVE COMPOSITIONS

[75] Inventors: Louie G. Manino; Frederick H. Sexsmith, both of Erie, Pa.

[73] Assignee: Lord Corporation, Erie, Pa.

[22] Filed: Sept. 18, 1974

[21] Appl. No.: 507,155

Related U.S. Application Data

[62] Division of Ser. No. 465,967, May 1, 1974, which is a division of Ser. No. 237,071, March 22, 1972, Pat. No. 3,830,784.

[52] U.S. Cl............. 260/37 N; 260/42; 260/42.26; 260/42.41; 260/42.44; 252/182
[51] Int. Cl.............................................. C08g 22/00
[58] Field of Search ..... 260/37 N, 42.26, 42, 42.44, 260/42.47, 42.41; 252/182

[56] References Cited
UNITED STATES PATENTS

| | | | |
|---|---|---|---|
| 2,405,971 | 8/1946 | McAlevy | 260/92.8 AC |
| 2,835,624 | 5/1958 | Cousins | 260/85.3 |
| 2,905,582 | 9/1959 | Coleman et al. | 260/32.4 |
| 3,051,666 | 8/1962 | Snoddon | 260/3.5 |
| 3,282,883 | 11/1966 | DeCrease et al. | 260/33.6 R |

*Primary Examiner*—M. J. Welsh

[57] ABSTRACT

Shelf-stable adhesive compositions for bonding metal and textile substrates to elastomers during vulcanization comprising a solution of at leasts one polyisocyanate and at least one halogen-containing polymer in which a poly-C-nitroso aromatic compound is suspended, said adhesive compositions having incorporated therein at least one inert filler material.

10 Claims, No Drawings

3,879,337

ADHESIVE COMPOSITIONS

This application is a division of application Ser. No. 465,967, filed May 1, 1974; itself a division of application Ser. No. 237,071, filed Mar. 22, 1972, now U.S. Pat. No. 3,830,784, issued Aug. 20, 1974. Applicant claims priority date of application Ser. No. 237,071, filed Mar. 22, 1972.

A need has existed in the art for a shelf-stable single-component adhesive system which can be utilized to bond a variety of substrates including metal substrates, and organic substrates, including leather, fabrics, cords and the like, to a variety of vulcanizable elastomers during vulcanization to form a strong adhesive bond between the substrate and the elastomer. Such an adhesive system should be capable of standing for long periods of time without gelling or pasting, provide effective bonding with a single application, and cure at vulcanization temperatures.

U.S. Pat. No. 3,282,883 discloses an adhesive composition which contains chlorosulfonated polyethylene, dinitrosobenzene, and a sterically hindered orthoalkoxy aryl diisocyanate. This adhesive, the stability of which is primarily due to the lack of reactivity of the particular diisocyanate employed, is useful primarily as a rubber-to-metal adhesive although it can be used for bonding elastomers to each other and to other solid substrates such a fabrics. U.S. Pat. No. 2,835,624 discloses that filaments, fibers, cords and fabrics treated with a solution of a butyl rubber containing an organic isocyanate and a dinitrosobenzene form an improved bond with butyl rubber upon vulcanization of the rubber. The adhesive composition of this invention provides improvements over those of the aforementioned patents. U.S. Pat. No. 3,051,666, discloses an adhesive composition which contains chlorosulfonated polyethylene, sulfur, carbon black, chlorinated rubber, and polymethylene polyphenylisocyanate in xylene as a solvent. The adhesives are disclosed as useful for bonding elastomers to metals.

It is the principal object of this invention to provide a novel improved adhesive composition which is shelf-stable as a single package.

It is another object of this invention to provide an extremely versatile adhesive composition useful in bonding a wide variety of substrates, including metals, and organic substrates, including leather, fabrics, cord, and the like, to a wide variety of vulcanizable elastomers during vulcanization.

A further object is to provide an adhesive composition which produces high bond strength when cured at moderate or high temperatures.

Another object is to provide an improved solvent-based adhesive composition containing one or more polyisocyanates which are normally reactive at room temperature and above, an acidic halogen-containing polymer, a poly-C-nitroso aromatic compound and an inert filler, which does not gel on standing for long periods of time and which provides the desired bond after a single application.

Still another object of the invention is to provide an adhesive composition which remains effective and tack-free after application to metallic or organic substrates, thereby enabling excellent layover of the treated substrate before being combined with an elastomer.

Yet another object of this invention is to provide an adhesive composition which can be applied to a leather, fabric, cord or the like, and not seriously affect the physical properties of the leather, fabric or cord, even after a layover of significant duration.

These and other objects and advantages of the invention will become apparent from a consideration of the following specification and claims.

DETAILED DESCRIPTION OF THE INVENTION

This invention relates to a novel shelf-stable adhesive composition, and, more particularly, it relates to a solvent-based composition containing at least one polyisocyanate normally reactive at room temperature, at least one acidic halogen-containing polymer, at least one poly-C-nitroso aromatic compound and at least one inert filler, which composition has an extended shelf life and which is capable of bonding a variety of metallic and organic substrates such as leather, fabrics, cords, and the like, to a wide variety of vulcanizable elastomers during vulcanization.

The adhesive compositions of the present invention are solutions of at least one polyisocyanate normally reactive at room temperature, and at least one acidic halogen-containing polymer having at least one poly-C-nitroso aromatic compound suspended therein, in combination with at least one inert filler material, in which compositions the polyisocyanate is present in an amount between about 5 and about 60 percent, the halogen-containing polymer is present in an amount between 10 and about 70 percent, and the poly-C-nitroso aromatic compound is present in an amount between about 2 and about 35 percent, said percentages being by weight based on the total weight of these ingredients, and wherein the filler material is present in an amount in the range between about 5 to about 35 parts by weight per 100 parts of combined weight of polyisocyanate, halogen-containing polymer and poly-C-nitroso aromatic compound, and the total solids content (TSC) of the composition is between about 5 percent and about 50 percent, based on polyisocyanate, halogen-containing polymer and poly-C-nitroso aromatic compound.

The preferred adhesive composition is a solution of polymethylene polyphenylisocyanate and chlorosulfonated polyethylene having a dinitrosobenzene suspended therein and carbon black, the percentages of the ingredients being as specified above.

The above-described adhesive composition has marked advantages over currently available adhesives. The adhesive has great versatility, being capable of bonding a wide variety of substrates including metallic and organic substrates. Suitable metallic substrates include any of the common structural materials including iron, steel, including stainless steel, lead, aluminum, copper, brass, bronze, Monel metal, nickel, zinc, and the like. The organic substrates include leather, and all common textile materials such as polyester, polyamide, rayon and cotton fabrics, cords and the like. Such substrates are bonded to a wide variety of vulcanizable elastomers, including natural rubber, styrene-butadiene rubber (SBR) of both high and low durometer grades and oil-extended types; neoprene (G and W types); butyl rubber, ethylene-propylene terpolymer rubber; butadiene-acrylonitrile rubber; chlorosulfonated polyethylene rubber; and the like. In general, the adhesive solution is applied to the substrates, and dried; the adhesive-coated material is then applied to the vulcanizing elastomer and on subsequent curing of the elastomer, the resulting assembly is bonded into a unitary body having high bond strength between the elastomer and the substrate. In addition to fabrics, cords, yarns, filaments and fibers, sheet materials can also be coated with the adhesive and bonded to elastomer substrates.

The polyisocyanates useful in the invention are those which are normally reactive at room temperature or above. More specifically, operable diisocyanates include toluene diisocyanate (TDI); methylene di-(phenylisocyanate) (generally referred to as MDI); triphenyl methane triisocyanate; naphthalene diisocyanate; and the like.

The preferred polyisocyanate is polymethylene polyphenylisocyanate, a liquid polyfunctional isocyanate, which may be approximated by the formula:

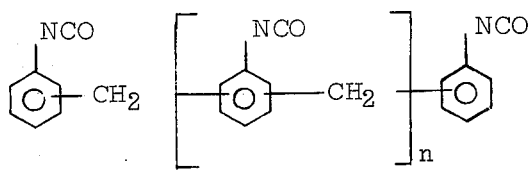

wherein $n$ has an average value from 0 to 4, preferably from 0.3 to 1.8. The polymethylene polyphenylisocyanates for use in the adhesive compositions of this invention are well-known commercially available materials.

Suitable acidic halogen-containing polymers include halogenated elastomers such as chlorinated natural rubber, chlorinated ethylenepropylene terpolymer, brominated polydichlorobutadiene, chlorinated polyvinyl chloride, and the copolymer of 2,3-dichlorobutadiene and α-chloroacrylonitrile and the like. These polymers are known in the art for their utility in elastomer bonding compositions. All of these materials have a tendency to be slightly acidic in nature due to the release of hydro-halogen acids, i.e., hydrochloric or hydrobromic acid.

The preferred acidic halogen-containing polymers are chlorosulfonated polymers of polyethylene which are amorphous materials which, by themselves, have little utility as adhesives. They generally contain from about 10 to about 60 percent, preferably about 15 to 45 percent of chlorine and from about 0.1 to about 5 percent, preferably 0.5 to 2.5 percent, of sulfur. It is believed that most of the chlorine is substituted along the hydrocarbon chain and that the sulfur is combined with the chlorine being attached to the chains as sulfonyl chloride groups. The substitution is believed to be random, and, in a preferred polymer, there is an average of about one chlorosulfonyl group for every 17 carbon atoms. Chlorosulfonated polyethylene polymers are available commercially in various grades differing as to density, molecular weight, and the like. Any one, or mixtures of these grades can be used. In general, it can be said that the chlorosulfonated polyethylenes have over 20 carbon atoms and molecular weights above 1000. U.S. Pat. No. 2,405,971 discloses a method of making a chlorosulfonated polyethylene.

A wide variety of poly-C-nitroso aromatic compounds are operable in the present invention, including those listed in U.S. Pat. No. 2,905,582, which is hereby incorporated by reference. The preferred dinitroso compounds are m- and p-dinitrosobenzenes, of which the latter is especially preferred for economic reasons.

In the preferred adhesive composition of the present invention, the polyisocyanate will be present in an amount between about 5 to about 60 percent; the acidic halogen-containing polymer will be present in an amount between about 10 and about 70 percent, and the poly-C-nitroso aromatic compound will be present in an amount between about 2 and about 25 percent; these percentages being by weight and based on the combined weight of the three stated materials; and the inert filler material will be present in an amount in the range from about 2 to about 35 parts by weight per 100 parts of combined weight of polyisocyanate, halogen-containing polymer and poly-C-nitroso aromatic compound. Especially preferred compositions of the present invention will contain between about 25 and about 50 percent of polymethylene polyphenylisocyanate; between about 30 and about 60 percent of chlorosulfonated polyethylene; between about 4 and about 20 percent of dinitrosobenzene; and from about 5 to about 30 parts by weight of inert filler material.

To prepare the adhesive compositions of the invention, the acidic halogen-containing polymer is dissolved in one of the well-known solvents therefor, and in which the polyisocyanate is also soluble or at least dispersable, but in which the poly-C-nitroso aromatic compound is substantially insoluble. Such solvents include aromatic hydrocarbons like benzene, toluene, xylene, and the like; chlorinated hydrocarbons like trichloroethylene, perchloroethylene, and the like; and combinations thereof, such as combinations of an aromatic hydrocarbon and a chlorinated hydrocarbon. The dinitrosobenzene is added to the solution of polymers in finely divided form and suspended therein. The inert filler material can be incorporated by conventional techniques such as ball mixing. The solids content, including polyisocyanate, acidic halogen-containing polymer, poly-C-nitroso aromatic compound and filler material, of the resulting mixture will be between about 5 and about 50 percent, by weight, preferably between about 15 and about 40 percent.

Various additives such as pigments, extender materials, and the like, may be included in the adhesive compositions in proportions known in the art. The filler materials employed herein enhance the viscosity and other properties desirable from the standpoint of application of the adhesive. Suitable fillers which can be employed include finely-divided substantially inert solid materials, with carbon black, silica and titanium dioxide (pigment grade), being especially preferred. These additives, including the inert filler materials, are incorporated into the adhesive compositions of the invention by conventional techniques, such as by ball mixing, and the like.

In use, the adhesive compositions of this invention may be applied to various substrates by dipping, brushing, spraying, and the like. The amount of the adhesive applied will vary with the application method, material to which applied, and the elastomer to be bonded thereto. For most organic textile applications, a pickup of 3 to 15 percent, by weight, of the adhesive based on the weight of the untreated textile, will provide satisfactory results. The adhesive-coated yarn, filaments, fiber, cord or fabric is then dried by removal of solvent. This can be accomplished under ambient conditions, e.g., room temperature, or by the use of heat or forced air. Room temperature drying generally takes about 15 to about 30 minutes, whereas drying at elevated temperatures can vary from six minutes at 250° F. to 2 minutes at 400° F. The dried film of adhesive is essentially tack-free. For application to metal substrates, the adhesive compositions can be used full strength or diluted up to 100 percent by volume with a suitable solvent and applied by conventional dip, spray, or brush coating methods.

An important aspect of this invention resides in the excellent layover characteristics of the adhesive-coated substrates. Thus, products coated with an adhesive of the invention may be stored in a clean, dry area for bonding at a later time. The adhesive-coated substrates, although stored for a month or longer, still provide excellent adhesion to vulcanizable elastomers.

The adhesive coated substrates can be bonded to elastomers by application of the adhesive-coated material to vulcanizable elastomer and curing the elastomer. Curing of the elastomer also causes curing of the adhesive and bonding of the substrate to the elastomer. Depending upon the particular elastomer, curing can be carried out at temperatures ranging from about 240° to about 400° F. for a time commensurate with the temperature employed. Curing may require as long as several hours at relatively low temperatures, e.g., 240° F., whereas at the higher temperatures, curing can occur in a few minutes. For most elastomers, representative curing conditions are 288° to 320° F. for 5 to 30 minutes. The following examples are set forth to further illustrate this invention.

EXAMPLE 1

An adhesive was prepared by dissolving 10 parts of chlorosulfonated polyethylene ("Hypalon", Grade No. 40 of E. I. du Pont de Nemours & Company, Inc.), and 10 parts of polymethylene polyphenylisocyanate ("PAPI" of Upjohn Company) in a combination of 43 parts of xylene and 104 parts of trichloroethylene. 1 part of p-dinitrosobenzene and 5 parts of carbon black were dispersed in the polymer solution. The solids content was 15 per cent.

The composition had an apparent viscosity of 225 cps (Brookfield Viscometer, No. 2 spindle, 30 rpm, 77° F.). A sample thereof stored for 6 months in closed container at 70° F. showed no evidence of gel formation. The stability of the adhesive composition was further evaluated by determining the viscosity of the adhesive after accelerated storage in a closed container for 30 days at 130° F. The viscosity was found to be 265 cps, indicating good stability. The bonding strength of the adhesive was not adversely affected by the accelerated storage conditions.

It was not necessary to scrupulously free the total system of water. Nor did open exposure to moisture-laden air seem to hurt. When an open container of the adhesive was exposed to the ambient atmosphere for 21 days, it did not gel.

EXAMPLE 2

This Example illustrates the versatility of the adhesive composition of Example 1 in bonding fabrics coated therewith to a variety of vulcanizable elastomers. The various rubber stocks employed in this and the other Examples herein are designed, A, B, C, D, and E. Rubber stock A is a natural rubber stock composed of 100 parts, by weight of smoked sheet, 3 parts of zinc oxide, 2 parts of stearic acid, 1 part of N-phenyl-beta-naphthylamine, 40 parts of carbon black (high abrasive furnace), 0.6 parts of N-oxydiethylene benzothiazole-2-sulfenamide and 2.15 parts of sulfur; rubber stock B is a polychloroprene stock composed of 100 parts, by weight, of polychloroprene (Neoprene GNA), 75 parts of carbon black (fine thermal), 10 parts of naphthenic process oil(sp. g. of 0.9230, SUS viscosity at 100° F. of 156), 5 parts of zinc oxide, 4 parts of magnesia, 2 parts of N-phenyl-beta-naphthylamine, 1 part of petrolatum, 1 part of stearic acid and 1 part of sulfur; rubber stock C is buna N stock composed of 100 parts of buna N (butadieneacrylonitrile copolymer), 1 part of stearic acid, 10 parts of terpene polymer, M. P. 10° C., predominately a polymer of beta-pinene ("Piccolyte S-10" of Pennsylvania Industrial Chemical Corporation), 10 parts of dibutyl phthalate, 5 parts of zinc oxide, 65 parts of carbon black (furnace), 0.3 parts of tetramethyl thiuram monosulfide and 1 part of sulfur; rubber stock D is an SBR stock composed of 100 parts SBR (butadienestyrene copolymer), 50 parts of carbon black (high abrasive, furnace), 5 parts of zinc oxide, 1 part of stearic acid, 8 parts of saturated polymerized petroleum hydrocarbons, sp.g. 0.95–1.02, viscosity, Saybolt Furol, at 140° F., 250–350 seconds ("Para-Flux" of the C. P. Hall Company), 1.75 parts of sulfur and 1.25 parts of N-cyclohexyl-2-benzothiazole-sulfenamide; and rubber stock E is a butyl rubber stock composed of 100 parts of butyl rubber, 1 part of stearic acid, 5 parts of zinc oxide, 50 parts of carbon black (high abrasive furnace), 1 part of benzothiazyl disulfide, 1.5 parts tellurium diethyldithiocarbamate and 1 part of sulfur.

The adhesive composition was applied to several 4.5 inch × 6.5 inch pieces of polyester fabric and dried for 30 minutes until tack-free. The coated fabric was sandwiched between two 5 inch ×7 inch ×⅛ inch pads of the particular elastomer and the resulting assembly was wrapped with masking tape. The assembly was cured for 30 minutes at 307° F. and allowed to stand overnight. One inch strips of the cured assembly were cut and pulled at an angle of 180° on a tensile tester at a speed of 2 in./min. The pull values in pounds per inch are set forth in Table I.

TABLE I

| Elastomer | Pull lbs./in. |
| --- | --- |
| Natural rubber (stock A) | 98 |
| Styrene-butadiene rubber (stock D) | 96 |
| Neoprene (stock B) | 103 |
| Butyl rubber (stock E) | 77 |
| Butadiene-acrylonitrile rubber (stock C) | 72 |

EXAMPLE 3

This Example illustrates the use of the adhesive composition of Example 1 in preparing fabric-rubber laminates. The adhesive was coated on 4 inch ×3 inch pieces of nylon fabric and dried. Each piece of the coated fabric was passed through mill rolls in superimposed position with a 5 inch ×7 inch by 1/10 inch thick piece of an elastomer. The elastomers used were natural rubber, styrene butadiene rubber and neoprene. The spacing between the mill rolls was slightly less than 1/10 inch. Each resultant laminate was then cured for 1 ½ hours at 250° F. under no pressure. Good adhesion was obtained between the fabric and elastomer.

EXAMPLE 4

This Example further illustrates the versatility of the adhesive composition of Example 1 in bonding a variety of textile materials to the previously described vulcanizable elastomers. The textile materials to which the adhesive composition was applied and the several elastomers to which the coated material was bonded are identified in Table II. The Table also sets forth the conditions under which the adhesive was dried and the conditions employed in curing the elastomer-adhesive coated product assembly. Peel adhesion values for each cured assembly are reported for each sample, the values being obtained in accordance with the procedure set forth in Example 2, using a 180° separation angle. The results obtained are expressed in terms of where failure occurred in the assembly, e.g., the adhesive coated material, the elastomer or the bond line.

| Ingredient | Parts by Weight |
| --- | --- |
| "Royalene" 400 * | 40 |
| "Royalene" 512 * | 80 |
| Carbon black (FEF) | 85 |
| Zinc oxide | 5 |
| Zinc stearate | 1.5 |
| Oil (Sunpar 2280) | 50 |
| Accelerators and Curing Agents | |
| MBT | 3 |
| Tuex | 0.8 |
| Butazate | 1.5 |
| Sulfur | 0.7 |
| Sulfasan R | 0.8 |

* Ethylene-propylene terpolymer rubber available from Uniroyal.

The adhesive was applied to primed metal coupons by dipping. The adhesive coated parts were allowed to dry, and then assembled, vulcanized and tested in accordance with ASTM procedure D429-68 Method B, modified to 45° angle. Vulcanization time of the EPDM

TABLE II

| Adhesive Coated Material | Elastomer | Adhesive Drying Conditions Time (Min) | Adhesive Drying Conditions Temp. (F.) | Cure Conditions Time (Min) | Cure Conditions Temp. (F.) | Test Results |
| --- | --- | --- | --- | --- | --- | --- |
| 1. Untreated cotton fabric | Natural rubber | | R.T.* | 30 | 307 | Failure in cotton |
| 2. Untreated Polyester cord | Neoprene | 5 | 300 | 30 | 307 | Failure in neoprene |
| 3. Scoured,heat set nylon | Nitrile | 15 | 300** | 30 | 307 | Failure in nitrile |
| 4. Rayon | Styrene butadiene (SBR) | 10 | 300** | 30 | 307 | Failure in SBR |
| 5. Scoured,heat set nylon | Butyl | 10 | 300** | 30 | 320 | Failure in butyl |
| 6. Polyester cord | Styrene butadiene (SBR) | 2 | 400 | 30 | 307 | Failure in SBR |

*R.T. = Room temperature.
**Adhesive coated material dried at room temperature before further drying specified.

EXAMPLE 5

This Example illustrates an adhesive composition utilized as a rubber-to-metal adhesive. The adhesive was prepared by dissolving 25 parts of chlorosulfonated polyethylene (a mixture of "Hypalon", Grades 30 and 40 of E. I. du Pont de Nemours & Company, (Inc.) in a ratio of 4 parts of the former to 1 part of the latter), and 20 parts of polymethylene polyisocyanate ("PAPI" of the Upjohn Company) in a mixture consisting of 120 parts of trichloroethylene and 140 parts of xylene. 10 parts of p-dinitrosobenzene and 10 parts of carbon black (Philblack S315 of Phillips Petroleum Company) were dispersed in the polymer solution. The solids content was 20 percent.

This composition had an apparent viscosity of 260 cps (Brookfield Viscometer, No. 2 spindle, 30 rpm, 77° F.) and was utilized to bond a series of EPDM rubber elastomers to steel. A typical elastomer employed in this series of tests was an ethylene-propylene terpolymer rubber having the following composition:

rubber was 30 minutes at 307° F. A bond strength of 131 lbs./in. was obtained in the peel test with failure entirely in the EPDM elastomer.

The excellent bonding ability, coupled with the stability both of the adhesive composition per se and of the adhesive coated products, is quite surprising.

EXAMPLE 6

The procedure of Example 1 was repeated substituting toluene diisocvanate (TDI) for the polymethylene polyphenylisocyanate (PAPI) to produce a stable adhesive composition of the invention which was utilized to bond natural rubber (stock A above) to primed steel according to the procedure of Example 5. Two different samples of the resulting laminate were tested by ASTM procedure 429-68 Method B, modified to 45° angle and found to have peel strengths of 40 and 48 lbs./in., respectively, for an average value of 44 lbs./in.

EXAMPLE 7

An adhesive was prepared by dissolving 10 parts (47.6 percent) of chlorosulfonated polyethylene ("Hypalon" Grade No. 40) and 10 parts (47.6 percent) of polymethylene polyphenylisocyanate ("PAPI") in a combination of 43 parts of xylene and 9 parts of trichloroethylene. One part (4.8 percent) of dinitrosobenzene and 5 parts of carbon black were dispersed in the polymer solution together with 6 parts of Hi Sil 223. The solids content of the polyisocyanate and acidic polymer was about 15 percent. The adhesive was employed in bonding a natural rubber (stock A above) to a polyester fabric according to the procedure of Example 2. A strong bond resulted, similar to those of the foregoing Examples.

In order to develop a rational explanation for the unexpected shelf-life qualities of the present adhesive, it has been theorized that the acidic halogen-containing polymer component of the adhesive acts as an acidic buffer or base scavenger, thereby providing long term stability to the adhesive. Chlorosulfonated polyethylene, for example, has sulfonyl chloride groups extending from the polyethylene backbone. These sulfonyl chloride groups are free to react with the amines produced when the polyisocyanate combines with any water present in the adhesive forming a stable sulfonamide and eliminating the possibility of amine-isocyanate catalysis. This same acidic or base-scavenging function of the chlorosulfonated polyethylene obviates the base catalyzed hydrolytic degradation of the fiber, cord, or the like, to which the adhesive is applied. This, also, is an important attribute, since it is recognized that isocyanates in general, have a destructive effect on certain synthetic fiber, such as polyester fibers and cord.

EXAMPLE 8

In order to test our theory that the acidic halogen-containing polymers are responsible for the unexpected shelf-life of the adhesive compositions of the present invention by acting as an acidic buffer or base scavenger, an adhesive was prepared employing a neutral polymer rather than an acidic polymer according to the invention. The procedure of Example 1 was repeated substituting cellulose acetate butyrate for the chlorosulfonated polyethylene. The resulting adhesive composition eventually gelled on storage after several months, whereas the composition prepared employing the chlorosulfonated polyethylene ("Hypalon") in Example 1 remained in a useful condition indefinitely after the composition of this Example had gelled and become useless.

In other similar experiments, non-yellowing polymethylene polyisocyanate prepolymer compositions wer made up employing neutral vinyl chloride-vinyl acetate copolymer on the one hand and the chlorosulfonated polyethylene ("Hypalon") on the other. In neither case was the alloying component scrupulously freed of traces of moisture, which of course tends to cure such polyisocyanate compositions. Again on standing, the vinyl resin-containing compositions increased in viscosity, whereas the viscosity of the chlorosulfonated polyethylene compositions remained virtually unchanged. It was also noted that even catalyzed films of the chlorosulfonated polyethylene polyisocyanate alloys were more sluggish to moisture (ambient) cure than the vinyl alloyed formulations.

The procedure of Example 1 may be employed to produce a variety of shelf-stable adhesive compositions of the invention containing from 5 to 60 percent of a suitable polyisocyanate of the type normally reactive at room temperature, such as methylene di(phenylisocyanate), triphenyl methane triisocyanate or naphthalene diisocyanate; and 10 to 70 percent of an acidic halogen-containing polymer such as chlorinated natural rubber, chlorinated ethylene-propylene terpolymer, brominated polydichlorobutadiene, chlorinated polyvinyl chloride, copolymers of 2,3-dichlorobutadiene and $\alpha$-chloroacrylonitrile; in which is suspended about 2 to 35 percent of a poly-C-nitroso aromatic compound such as those listed in U.S. Pat. No. 2,905,582 or preferably, m- and p-dinitrosobenzene; and an effective amount, preferably about 2 to about 35 parts by weight per 100 parts of combined weight of polyisocyanate, acidic halogen-containing polymer and poly-C-nitroso aromatic compound, of at least one finely divided inert filler such as carbon black; the solids content of such compositions ranging from about 5 to 50 percent.

The compositions described above are illustrative of others which will now be apparent to those skilled in the art from the present disclosure and are not to be construed as limiting the appended claims.

What is claimed is:

1. An adhesive composition consisting essentially of a solution of at least one polyisocyanate normally reactive at room temperature and at least one acidic halogen-containing polymer in which is suspended at least one poly-C-nitroso aromatic compound, wherein said polyisocyanate is present in an amount between about 5 and about 60 percent, said halogen-containing polymer is present in an amount between about 10 and about 70 percent, and said poly-C-nitroso aromatic compound is present in an amount between about 2 and about 35 percent, said percentages being by weight based on the combined weight of polyisocyanate, acidic halogen-containing polymer and poly-C-nitroso aromatic compound, and
   an effective amount of at least one inert, finely-divided filler material,
   said adhesive composition having a total solids content in the range from about 5 to about 50 percent,
   said composition being characterized by an acidity sufficient to substantially reduce isocyanate activity.

2. An adhesive composition according to claim 1 wherein said filler material is present in an amount in the range of from about 2 to about 35 parts by weight per 100 parts of combined weight of polyisocyanate, acidic halogen-containing polymer, and poly-C-nitroso aromatic compound.

3. An adhesive composition according to claim 2 wherein the amount of polyisocyanate is in the range from about 25 to about 50 percent, the amount of acidic halogen-containing polymer is in the range between about 30 and about 60 percent, and the amount of poly-C-nitroso aromatic compound is in the range from about 4 to about 20 percent.

4. An adhesive composition in accordance with claim 3 wherein the amount of said filler material is in the range from about 5 to about 30 parts by weight per 100 parts of combined weight of polyisocyanate, acidic halogen-containing polymer, and poly-C-nitroso aromatic compound.

5. An adhesive composition according to claim 4 having a total solids content in the range between about 15 and about 40 percent.

6. An adhesive comosition composition to claim 1 wherein said polyisocyanate is polymethylene polyphenylisocyanate.

7. An adhesive composition according to claim 1 wherein said acidic halogen-containing polymer is chlorosulfonated polyethylene and said poly-C-nitroso aromatic compound is a dinitrosobenzene.

8. An adhesive composition according to claim 1 wherein said filler material is selected from the group consisting of carbon black, silica, and titanium dioxide.

9. An adhesive composition according to claim 6 wherein said filler material is selected from the group consisting of carbon black, silica and titanium dioxide.

10. An adhesive composition according to claim 7 wherein said filler material is carbon black.

* * * * *